(12) United States Patent
Taylor

(10) Patent No.: US 8,973,534 B2
(45) Date of Patent: Mar. 10, 2015

(54) POP UP TENNIS BALL PET TOY

(75) Inventor: Dale Taylor, Centennial, CO (US)

(73) Assignee: The Kyjen Company, Inc.

( * ) Notice: Subject to any disclaimer, the term of this patent is extended or adjusted under 35 U.S.C. 154(b) by 352 days.

(21) Appl. No.: 13/136,578

(22) Filed: Aug. 4, 2011

(65) Prior Publication Data

US 2013/0032096 A1   Feb. 7, 2013

(51) Int. Cl.
*A01K 15/02* (2006.01)

(52) U.S. Cl.
CPC .................................. *A01K 15/025* (2013.01)
USPC .......................................... 119/707; 119/702

(58) Field of Classification Search
CPC ... A01K 5/0144; A01K 15/02; A01K 15/025; A01K 15/026; A01K 15/027
USPC .................. 119/707, 702, 706, 709
See application file for complete search history.

(56) References Cited

U.S. PATENT DOCUMENTS

| | | | | |
|---|---|---|---|---|
| 5,314,368 A * | 5/1994 | Cheng | .......................... | 446/179 |
| 5,579,725 A * | 12/1996 | Boshears | ...................... | 119/706 |
| 5,609,341 A * | 3/1997 | Chuang | ......................... | 273/448 |
| 5,875,736 A * | 3/1999 | Udelle et al. | .................. | 119/706 |
| 6,568,353 B2 * | 5/2003 | Van Sluis | ...................... | 119/702 |
| 6,571,742 B1 * | 6/2003 | Tsengas | ....................... | 119/707 |
| 2005/0119063 A1 * | 6/2005 | Tupman et al. | ............... | 473/154 |
| 2005/0268862 A1 * | 12/2005 | Morrison | ...................... | 119/707 |
| 2008/0185783 A1 * | 8/2008 | Chen | ............................. | 273/287 |
| 2009/0095229 A1 * | 4/2009 | Plante | ........................... | 119/707 |
| 2009/0314221 A1 * | 12/2009 | Wang | ............................. | 119/707 |

\* cited by examiner

*Primary Examiner* — Monica Williams

(57) ABSTRACT

The invention relates to a pet toy wherein a two-piece molded plastic encasement contains apertures that allow a ball or balls to protrude and extrude as a result of rotation of the top of the toy and fixed raised protrusions which naturally cause a ball to essentially "appear" and "disappear" and an animal must solve by attempting to retrieve the moving ball or balls.

2 Claims, 3 Drawing Sheets

POP UP TENNIS BALL PET TOY

FIELD

The invention relates to a novel pet toy wherein the toy is a molded receptacle with apertures to receive a tennis ball. The receptacle is rotatable and the tennis ball or balls will randomly appear or "pop up" out of one of the apertures and the animal has to attempt to grab the ball or balls.

BACKGROUND OF THE INVENTION

The invention most closely corresponds with USPTO Class 119/702 wherein Class 119 relates to animal husbandry and sub-class 702 includes exercise or amusement devices for animals.

In its simplest form, the invention comprises a novel molded device wherein tennis balls may be inserted into one of a multitude of top apertures. The action of the toy includes a fixed, raised protrusion that will force the ball up and to the rim of the aperture at a sufficient height for the animal to retrieve the ball, however, the ball does not eject completely. The ball may then recede and appear out of another aperture. Multiple balls may be accommodated. Rotation is achieved by the animal "spinning" the top portion of the toy wherein said top portion has protruding tabs that the animal's paw catches on and causes rotation.

There are obviously many pet toys on the market. The inventive toy accomplishes exercise and amusement for the animal as well as a learning system that challenges the animal's powers of choice and memory. Further, the inventive toy provides a "reward" when the animal is able to retrieve the ball. It is the Inventor's goal to not only amuse the animal, but to teach it.

THE INVENTION

Summary, Objects and Advantages

The inventive toy may be shaped in any moldable form. The embodiment disclosed is a circular shape with circular apertures, but there could be many shapes the toy can be manufactured in and still achieve the same purpose.

The base and top portions are divided so that the notches or tabs on the moveable top portion may be rotated when an animal connects to the tabs or notches with its paw. The top portion then rotates, causing movement of the ball or balls. The rotation may also be effected by a wind-up mechanism on the bottom wherein the pet owner twists the mechanism and causes counter-clockwise rotation of the top portion of the toy.

Upon any rotation, the raised fixed protrusion causes the balls to naturally press upwards to the opening of the top apertures. As the mechanism rotates, the balls will extrude and retract automatically as they hit the fixed impediment, and alternately the space wherein no impediment protrudes.

The toy can also be battery operated and may contain a small motor which then causes rotation of the internal mechanism. The rotation may also be achieved using a simple wind-up mechanism. The protrusion and action of the balls remains the same.

In summary, the inventive toy exhibits advantages and novelty over the art in that the design and functionality make this pet toy safe, stimulating, durable, and reusable.

BRIEF DESCRIPTION OF THE DRAWINGS

The invention is described in further detail by reference to the drawings in which.

DETAILED DESCRIPTION, INCLUDING BEST MODES OF CARRYING OUT THE INVENTION

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in three relatively simple figures; although sufficiently complex as to illuminate to one skilled in the art of such software architecture, programming, and computer operations a viable method for making or using said invention.

Figure 1:
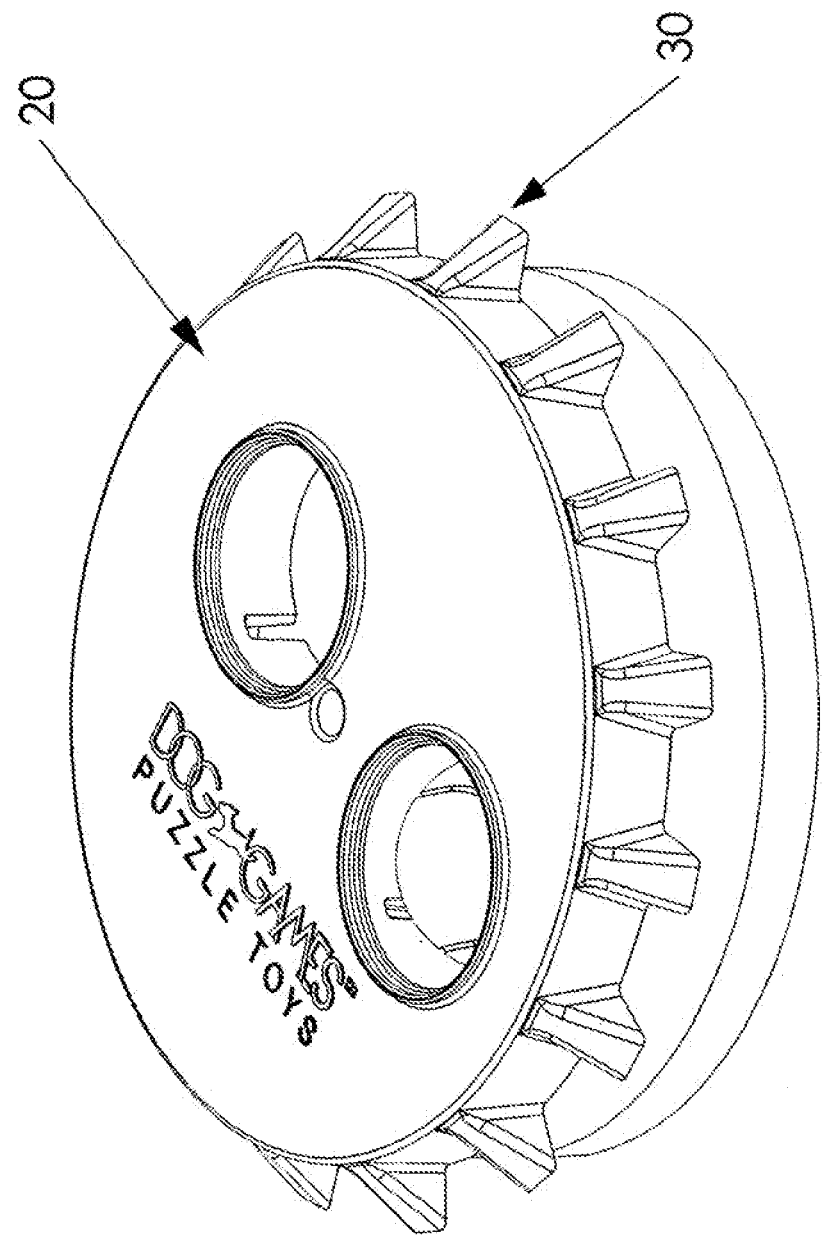
FIG. 1; shows the top view of the toy with apertures.

FIG. 1 is a top angled view of the toy 10. The apertures 20 wherein the ball or balls will protrude and extract are shown. The tabs or notches 30 are illustrated and are the means by which an animal may mechanically and manually cause the top portion of the toy to rotate.

Figure 2:
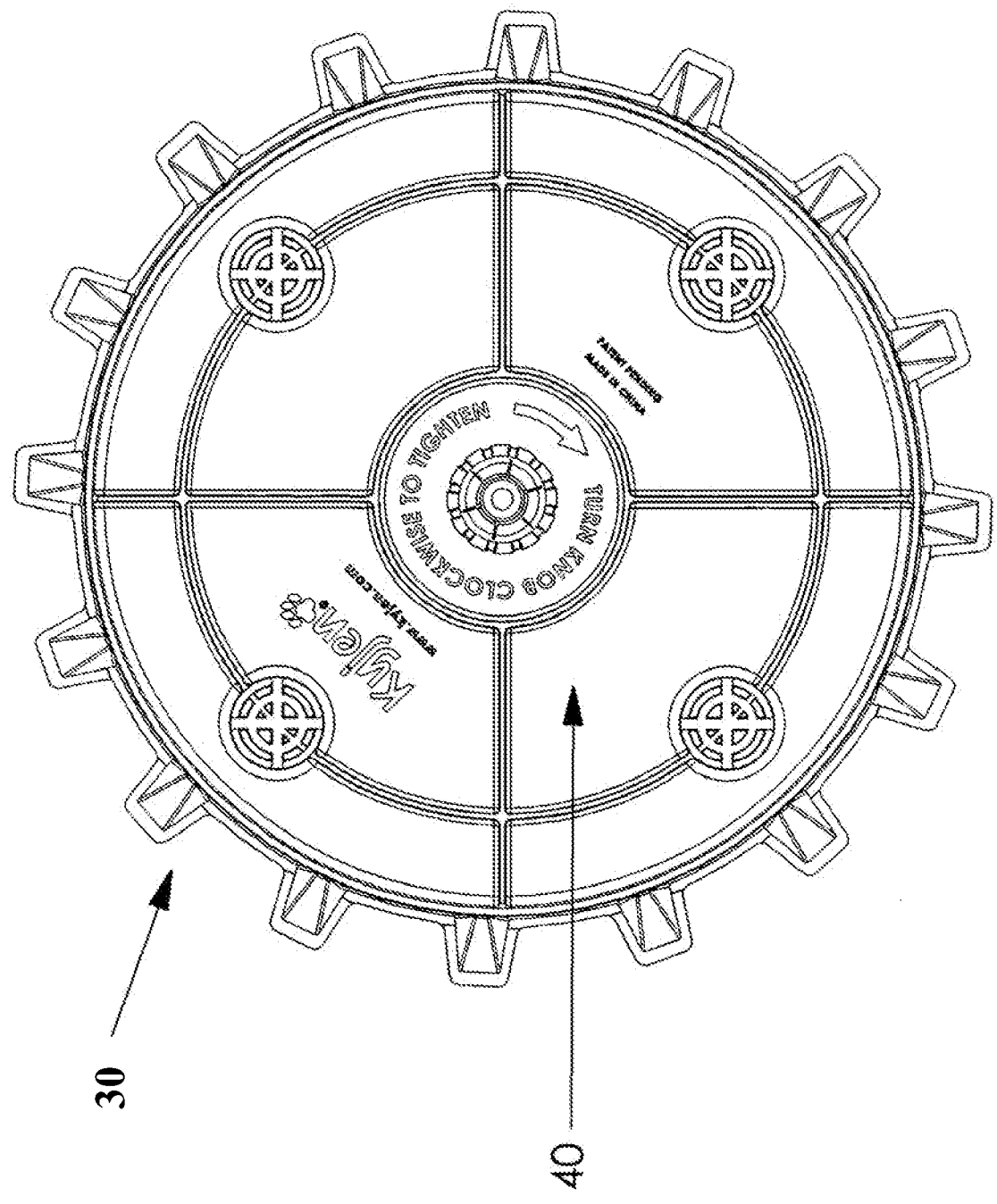
FIG. 2; shows the bottom view of the toy.

FIG. 2 is a simple view of the underside of the toy as assembled 40. Again, the notches or tabs 30 are shown which allow manual movement of the top portion of the toy.

Figure 3:
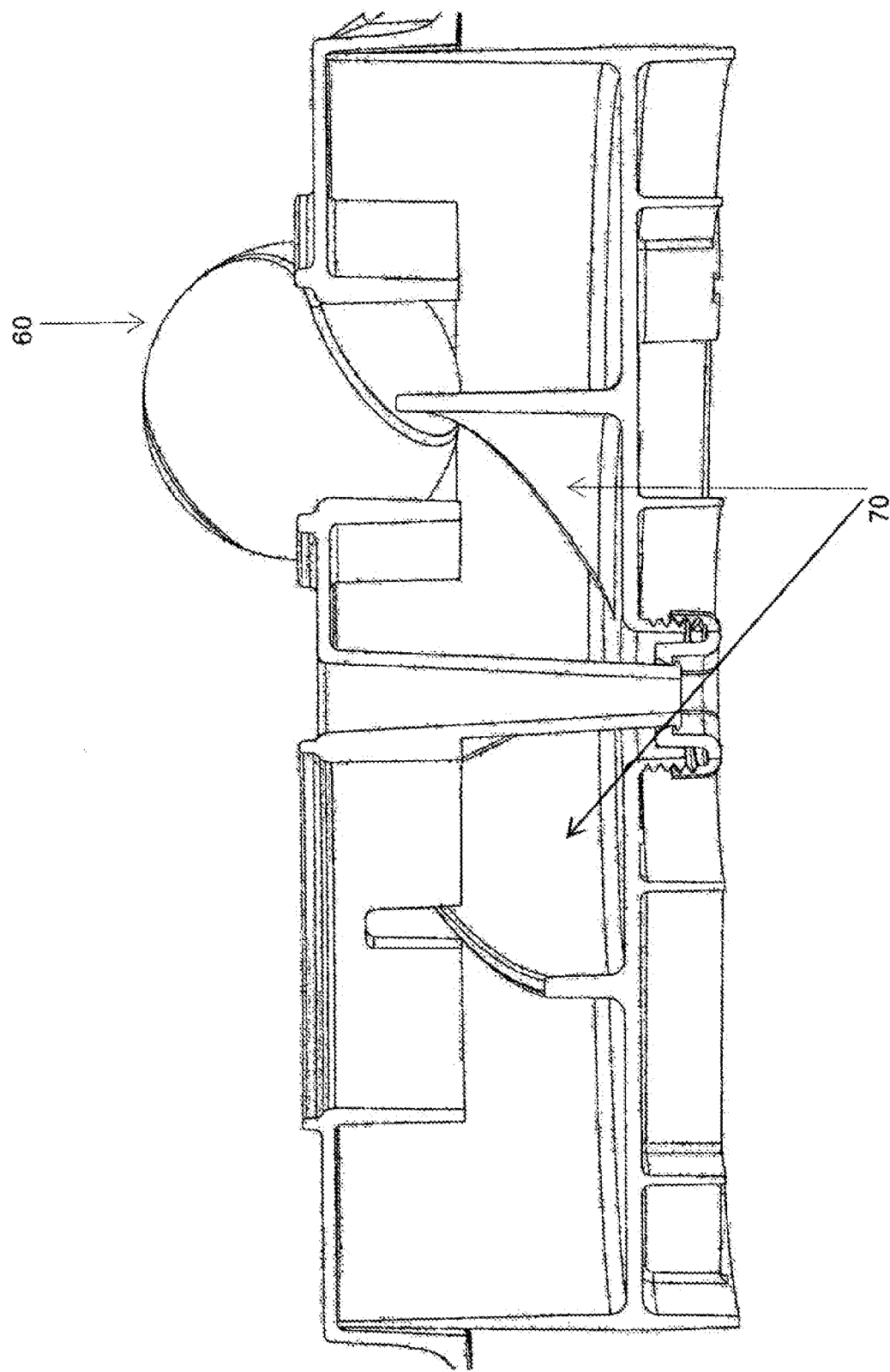
FIG. 3; is a cross section of the internal workings of the toy showing the protrusions.

FIG. 3 is a cross-section of the toy. A tennis ball is shown 60 in one of the apertures. The fixed protrusion 70 is shown cross-section and assists to illustrate how the ball will naturally be forced to protrude and extrude upon rotation of the top portion of the toy.

The invention claimed is:

1. A pet toy with circular apertures to cause protrusion of a ball upon rotation comprising:
    a two-piece plastic encasement comprising a top portion and a bottom portion with the circular apertures in the top portion, wherein the top portion and the bottom portion are affixed together and the top portion is configured to rotate while the bottom portion remains static;
    at least one ball inside the encasement;
    internal fixed raised protrusions in the bottom portion to cause the at least one ball to protrude out of the circular apertures in the top portion upon interference with the protrusions;
    notches or tabs on exterior sides of the top portion to allow manual rotational movement of the top portion of the toy caused by an animal's paw forcing rotation, wherein in use, the to portion is rotated by winding the to portion, the rotation causes movement of the at least one ball inside the encasement, when the at least one ball encounters the protrusions the ball is raised through the apertures in the top portion.

2. The pet toy of claim 1 further comprising wherein the top portion is configured to be rotated by a small battery powered motor.

\* \* \* \* \*